Patented May 5, 1953

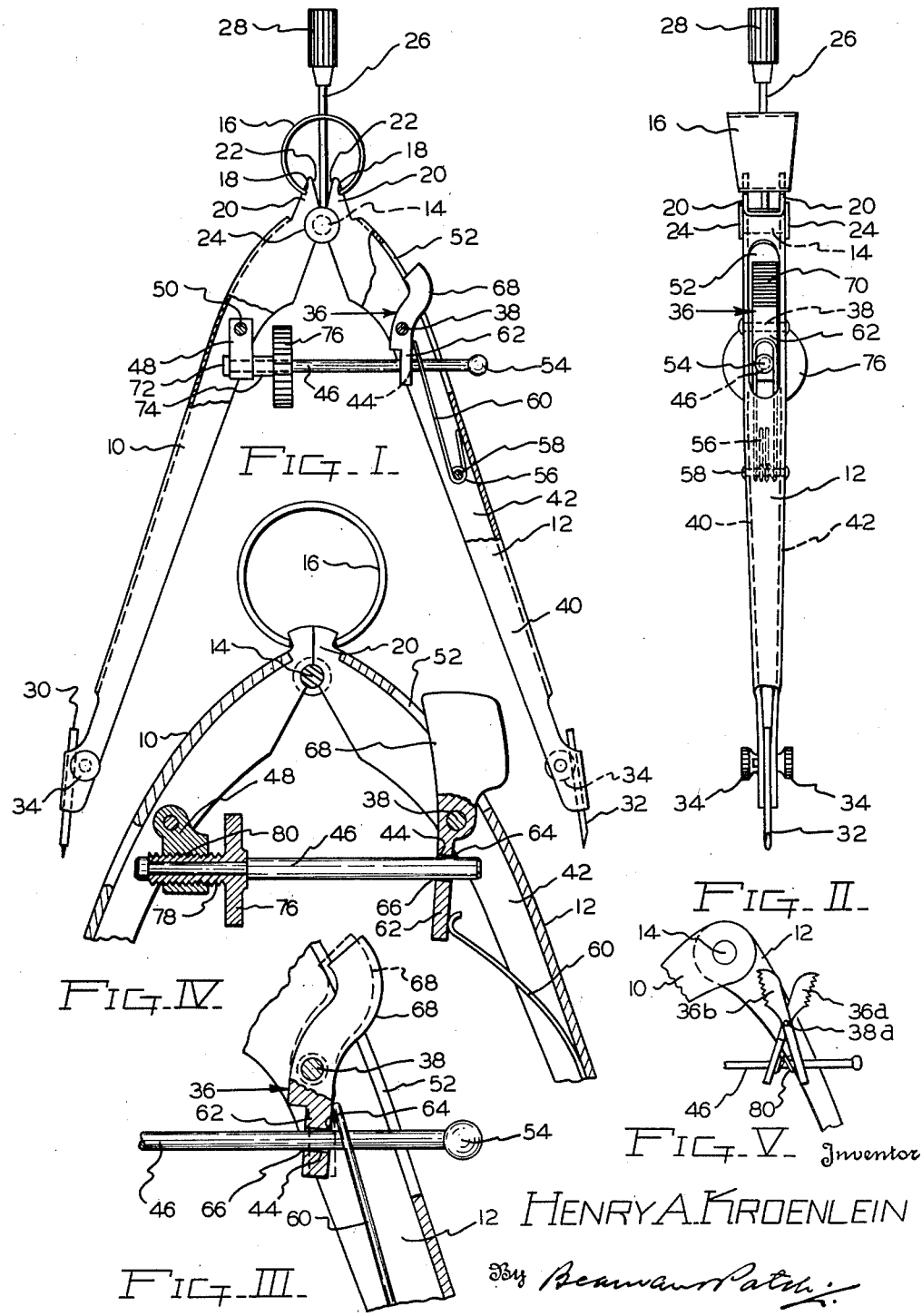

2,637,113

UNITED STATES PATENT OFFICE 2,637,113

BOW COMPASS

Henry A. Kroenlein, Los Angeles, Calif.

Application May 11, 1949, Serial No. 92,618

3 Claims. (Cl. 33—154)

This invention relates to bow compasses, as employed to describe arcs and circles, and to dividers and calipers, all of which are of similar construction in that they have a pair of leg members pivotally connected together at one end, and have free outer ends, the distance between which can be varied by adjustment of the angle defined at the pivoted end of said leg members.

Where the expression "compass" is employed herein, it is to be understood that this might well be taken to mean also dividers or calipers since each such device is of the same general construction and differs essentially only, as to the compass form of the invention, having the outer free end of one leg member formed to provide a bearing point about which the compass is employed to describe a circle traced by a pencil lead or other suitable scribing means carried at the free end of the other leg member.

The most commonly employed form of compasses resorts to the use of screw adjustment means to vary the distance between the free leg ends, or of friction means to hold such ends in adjusted position. An objection to the former is that the known screw adjustment means have to be employed for effecting both spreading and closing movements of the leg members and therefore involves both slow motion and tedious usage, whereas, an objection to the known friction type compasses is that they also involve tedious usage and the possibility of slipping occurring when the friction means deteriorate through wear or strain. In connection with the known screw adjustment compasses, the large amount of thumb wheel turning involved becomes especially annoying to draftsmen, who have frequently to change from small to large radii, and vice versa.

Proposals have also been made to provide compasses with adjustment means involving an accurate connecting piece between the leg members and a ratchet and pawl one-way automatic locking device which gives a free inward movement of the one leg member relative to the other and which pawl can be released to free the said leg member to spring outward under the action of a spring incorporated in the pivoted mounting of the leg members and tending to urge these apart. Such known construction, however, possesses the disadvantage that adjustment is only possible within the limits of the ratchet teeth and is thereby relatively coarse and does not permit the obtaining of a fine precision adjustment of said leg member.

The present invention provides a compass, dividers or calipers, the leg members of which are capable of being spread apart or moved inwards relative to each other with a fast or free action, with the occurrence of an automatic locking of the one leg member relative to the other in a selective angular position thereto and the possibility of the one leg member being freely adjusted with precision inwards or outwards to its required final position and the same being rigidly held at such position.

It is thus an object of the invention to provide a compass, dividers or calipers which enables both rapid and fine adjustment changes in the relative angular setting of the leg members to be accomplished rapidly and easily over the entire operating range of the instrument and for the final setting to be rigidly held and capable of being produced with a high degree of precision, not possible with a ratchet and pawl mechanism.

A further and important object of the invention is to provide a compass, dividers or calipers in which a canting lever locking action is employed to control the opening and closing movements of the one leg member relatively to the other and with the possibility of obtaining a fine closing adjustment and a fine creeping action opening adjustment.

The above and other objects and advantages of the invention residing in the construction, arrangement and combination of parts will appear clear from a consideration of the following description with reference to the accompanying drawings and from the annexed claims.

In the drawings,

Fig. I is a side elevational view of one form of the invention, shown in the form of a compass with the leg members spread apart and portions thereof broken away to reveal internal actuator parts and sections, Fig. II is an end-on view of Fig. I, Fig. III is an enlarged fragmentary view through the canting lever and associated parts, Fig. IV is a fragmentary view, partly in section, of a modified form of the invention, employing an adjustment screw action in combination with the canting lever action, and Fig. V is a fragmentary view of a modified form of the invention employing a pair of canted locking members giving automatic locking actions in opposite directions.

Referring to the drawings, a bow compass is shown comprising a pair of leg members 10 and 12 pivotally mounted at one end about a pivot pin 14 and held thereto by the action of a c- spring 16 having its ends engaged in recesses 18 in the leg extremities 20, which latter are formed to present mutually engageable opposed edges 22 which function as a stop to limit further outward movement of the leg members when said edges are brought into engagement with each other.

The pivot pin 14 has end flanges 24 which confine the leg members axially upon the pivot pin and the latter serves to anchor one end of a fixed rod 26 which extends centrally through the C-spring and has a knurled head piece 28 by which the compass is held in use.

The one leg member 10 is shown fitted with a centering pin 30 and the other with a pencil lead 32, both adjustably screwed in position in a known manner by actuation of the screws 34.

Each leg member is of channel section and within the leg member 12 there is mounted a double arm canting lever, indicated generally at 36, pivoted upon a cross pin 38 secured between the opposed leg sides, seen at 40 and 42 in Fig. II, and having an opening 44 therethrough which presents a clearance fit with respect to a link rod 46 slidably mounted in said opening and rotatably anchored at one end upon a short lever arm 48 pivoted within the other leg member 10 upon a cross pin 50 laterally aligned with said pin 38. Said link rod has a plain elongated surface portion, the importance of which will be described later.

The construction and arrangement are such that said link rod 46 tends always to be maintained in substantially the same straight line arrangement throughout the closing and opening movements of the leg members due to the pivoted movement of the lever arm 48 and the guiding action of the opening 44, as will be understood. It will be noted that the link rod is supported in position between the leg members in base forming relationship with respect to an isosceles triangle the sides of which are defined by the end portions of the leg members which include the variable angle at the pivotal connection of these leg members.

As stated, the opening 44 in the canting lever provides a clearance sliding fit for the link rod 46, one end of which projects through an elongated slot 52 in the arm 12 and is shown fitted with a knob 54. A spring 56 mounted in the leg member 12 by the cross pin 58 presents an arm 60 which, by engagement with the lever arm 62 of the double arm canting lever 36 tends constantly to maintain the latter in a canted position, as shown in full lines in Fig. III, in which position the link rod 46 is automatically held against sliding movement relatively to the canting lever by the friction maintained upon the top and bottom of the rod at the spaced points 64 and 66 (Fig. III) of the then inclined opening 44.

The construction and arrangement are such that whereas with the lever 36 held in its normal canted position by the spring 56, and as shown in full lines in Fig. III, the leg member 12 is free to be moved inwards with respect to the leg member 10, freedom of movement in the reverse direction is not possible due to the locking action at the points 64 and 66. Such free inward movement is possible since the applied pressure will tend to straighten the canting lever against the action of the spring 56.

However, the automatic locking action obtained by the constantly spring urged canting lever 36, and as above described, can be readily released at will by applying inward pressure to the other arm 68 of the canting lever, which arm projects through the slot 52 to the outside of the leg member 12, as shown in Figs. I and III, and is conveniently formed with a serrated surface 70 (Fig. II) to facilitate its actuation.

It will be appreciated therefore, that the construction thus far described provides for the leg member 12 being rapidly and freely moved inwards and automatically locked against outward movement in any adjusted position along the plane surfaced link rod 46. However, by simply pressing against the canting lever arm 68 it is easily possible to release the lock at the points 64 and 66 and thereby free the lever arm 12 to spring quickly outwards under the action of the C-spring 16.

The rod 46 is journalled for rotary movement upon the lever arm 48 and has its corresponding end confined upon said arm against axial movement relatively thereto by the presence of the end rod flange 72 (Fig. I) and a bushing 74 incorporated with a thumb adjustment wheel 76 fixedly mounted on the rod 46 so as to rotate the latter when actuated. This thumb adjustment wheel permits rotation of the rod to be effected and, with the assistance of the C-spring 16, results in a controlled axial creeping of the rod through the opening 44 in the inclined canting lever 36 in the direction which permits the leg member 12 to move outwards with a fine adjustment action to position the pencil lead 32 at the desired final point and this without actuating the canting lever arm 68, the canting lever being maintained positioned by its spring 56 to instantly and automatically lock the leg member 12 against the further outward movement the moment the rotation is ceased. This controlled opening movement of the leg member 12, by rotary adjustment of the wheel 76, can be further controlled, as to spread, by applying finger pressure against the leg member 12 in opposition to the action of the C-spring.

To open the compass, therefore, it is merely necessary to press the canting lever arm 68. This operates like a trigger to release the plain surface rod 46 for sliding movement with respect to the opening 44 under the action of the C-spring 16. By bringing one finger to bear against the lever arm 12 this rapid opening movement can be arrested in a desired position.

To close the compass it is merely necessary to press the leg members together, since the canting lever action permits freedom of movement in this direction and gives an immediate and automatic lock upon the closing pressure being discontinued.

To effect a fine opening adjustment of the compass, it is merely necessary to rotate the wheel 76. This produces the creeping action above referred to and enables the compass to be set at any desired and exact point.

Since the rod 46 is plain surfaced and the canting lever is cooperable therewith at any point along its effective length, it follows that the leg member 12 is capable of adjustment with a high degree of precision and fineness not possible with a ratchet and pawl action which requires that the pawl be engaged with a ratchet tooth before a lock is obtained.

In Fig. IV, the general construction is the same as in the previous figures and like parts have been given the same reference numerals. The only difference involved is the means and manner of effecting the fine adjustment of the compass legs, which is effected in this instance by the smooth surfaced rod 46 having a screw threaded bush 78 rotatably mounted thereon and incorporated with the wheel 76 and by this screw threaded bush being engaged in a screw threaded opening 80 in the lever arm 48. In this form of the invention the creeping action is dispensed with and the desired fine adjustment is effected by screwing the bush 78 into or out of the screwed opening in the lever arm 48.

Fig. V shows the one leg member 12 fitted with two canted locking members 36a, 36b pivotally mounted on this leg member at 36a and normally canted in opposite directions by the spring 80 to give an automatic locking action with the link rod 46 for both inward and outward movements of the leg member. Thus the one canted locking member 36a normally operates to hold the leg member 12 locked against movement to the right while the other canted locking member operates to hold the leg member locked against movement to the left. Either member can be swung to the release position at will, as will be understood from consideration of the above description.

Having thus described my invention, what I claim as novel and wish to secure by Letters Patent is as follows:

1. An instrument in the form of a bow compass, dividers or calipers, said instrument comprising a pair of leg members pivotally connected together at one end, spring means operatively associated with said leg members to constantly tend to urge the free ends thereof apart, a smooth elongated rod member, means pivotally mounting said rod member at one end on one leg member intermediate its ends, the other leg member having a guide opening, a pivoted canting plate member on said last mentioned leg member, said canting plate member having an opening through which the opposite end of said rod member is slidably guided with clearance when said plate member is moved to a relatively straightened position, additional spring means stressing said canting plate member normally to its canted position in which said last mentioned leg member is held locked against outward movement with respect to the other leg member but is free to be moved inwards with respect thereto, said canting plate member being accessible for actuation at will to move it to its relatively straightened position against the action of said additional spring means, whereby to allow said first mentioned spring means to open the instrument legs with a quick action, and means for rotating said rod in said plate to cause a creeping action between said rod and plate for a fine adjustment of said leg member.

2. An instrument in the form of a bow compass, dividers or calipers, said instrument comprising a pair of leg members pivotally connected together at one end, spring means operatively associated with said leg members to constantly tend to urge the free ends thereof apart, an elongated rod member, means pivotally and rotatably mounting said rod member at one end on one leg member intermediate its ends, a pivoted canting plate member on said last mentioned leg member, said canting plate member having an opening through which the opposite end of said rod member is slidably guided with clearance when said plate member is moved to a relatively straightened position, that portion of said rod guided in said plate having a smooth peripheral surface, additional spring means stressing said canting plate member normally to its canted position in which said last mentioned leg member is held locked against outward movement with respect to the other leg member but is free to be moved inwards with respect thereto, said canting plate member being accessible for actuation at will to move it to its relatively straightened position against the action of said additional spring means, whereby to allow said first mentioned spring means to open the instrument legs with a quick action, and means for rotating said rod member to produce an axial creeping action thereof relatively to the one leg member and thereby allow the same to move outwards with a fine precision action.

3. An instrument in the form of a bow compass, dividers or calipers, said instrument comprising a pair of leg members pivotally connected together at one end, separate means acting upon said leg members, a rod member connected on one end with one of the leg members and having a smooth portion, locking means on the other leg member adapted to co-act with said smooth portion of said rod member with a canted locking action, means to rotate said smooth rod portion so as to create a creeping movement between the rod member and said locking member in the direction the leg members may be urged by said spring means and means to release the canting action of the locking member for quick movement of the leg members relative to each other.

HENRY A. KROENLEIN.

References Cited in the file of this patent

UNITED STATES PATENTS

| Number | Name | Date |
|---|---|---|
| 429,069 | Stuart | May 27, 1890 |
| 682,294 | Terlin | Sept. 10, 1901 |
| 1,266,493 | Lackner | May 14, 1918 |
| 1,277,962 | Lonnqvist | Sept. 3, 1918 |
| 1,300,047 | Thomas | Apr. 8, 1919 |
| 2,255,328 | Nyberg | Sept. 9, 1941 |

FOREIGN PATENTS

| Number | Country | Date |
|---|---|---|
| 47,539 | Sweden | Aug. 11, 1920 |